(12) United States Patent
Lacey

(10) Patent No.: US 8,665,212 B2
(45) Date of Patent: Mar. 4, 2014

(54) SYSTEMS AND METHODS FOR LOCKING AN ELECTRONIC DEVICE

(75) Inventor: Jon-David Kenneth Lacey, Upper Tantallon (CA)

(73) Assignee: BlackBerry Limited, Waterloo, Ontario ( * ) Notice: Subject to any disclaimer, the term of this patent is extended or adjusted under 35 U.S.C. 154(b) by 92 days.

(21) Appl. No.: 13/178,903

(22) Filed: Jul. 8, 2011

(65) Prior Publication Data
US 2013/0009858 A1   Jan. 10, 2013

(51) Int. Cl.
*G09G 5/00* (2006.01)
(52) U.S. Cl.
USPC .......................................... 345/156; 345/169
(58) Field of Classification Search
USPC .......... 345/156, 168, 169, 170; 455/410, 565, 455/575.4; 349/433.07; 341/22; 250/214 AL; 340/501, 517; 397/433.07
See application file for complete search history.

(56) References Cited

U.S. PATENT DOCUMENTS

| | | | |
|---|---|---|---|
| 6,449,492 B1 * | 9/2002 | Kenagy et al. ............. | 455/550.1 |
| 6,985,137 B2 | 1/2006 | Kaikuranta | |
| 7,574,002 B2 | 8/2009 | Karan | |
| 7,646,378 B2 | 1/2010 | Hirshberg | |
| 7,792,544 B2 | 9/2010 | Vogedes et al. | |
| 7,800,044 B1 * | 9/2010 | Kahn et al. .............. | 250/214 AL |
| 8,036,152 B2 * | 10/2011 | Brown et al. ................. | 370/311 |
| 8,269,655 B2 * | 9/2012 | Minato et al. .................... | 341/24 |
| 2002/0077079 A1 | 6/2002 | Ishihara | |
| 2004/0092247 A1 | 5/2004 | Tani | |
| 2005/0116840 A1 * | 6/2005 | Simelius .......................... | 341/22 |
| 2005/0272462 A1 * | 12/2005 | Okamoto .................... | 455/550.1 |
| 2006/0043181 A1 * | 3/2006 | Naito et al. ..................... | 235/443 |
| 2006/0073844 A1 | 4/2006 | Chan et al. | |
| 2007/0042816 A1 | 2/2007 | Chan | |
| 2007/0099574 A1 | 5/2007 | Wang | |
| 2007/0161410 A1 | 7/2007 | Huang et al. | |
| 2007/0264983 A1 | 11/2007 | Chen et al. | |
| 2008/0290985 A1 | 11/2008 | Vogedes et al. | |
| 2009/0273895 A1 * | 11/2009 | Sakaguchi ............... | 361/679.27 |
| 2009/0280872 A1 * | 11/2009 | Kajiya et al. ................... | 455/574 |
| 2010/0178947 A1 * | 7/2010 | Kim et al. ...................... | 455/466 |
| 2010/0279657 A1 | 11/2010 | Matsuo | |
| 2010/0281416 A1 * | 11/2010 | Fuyuno ......................... | 715/773 |
| 2011/0136552 A1 * | 6/2011 | Lee ............................. | 455/575.3 |
| 2012/0044081 A1 * | 2/2012 | Koppal et al. .............. | 340/686.6 |

FOREIGN PATENT DOCUMENTS

| | | |
|---|---|---|
| EP | 1406427 | 4/2004 |
| GB | 2418808 | 4/2006 |

OTHER PUBLICATIONS

Intersil, "Light Sensor Applications," Published Aug. 28, 2008, 2 pages.

(Continued)

*Primary Examiner* — Joe H Cheng
(74) *Attorney, Agent, or Firm* — Hanley, Flight & Zimmerman, LLC.

(57) ABSTRACT

Systems and methods for locking an input device of an electronic device are described herein. An example method includes detecting a moving action of a housing of the electronic device from an open position to a closed position. The method includes detecting at least a first condition of the electronic device after detection of the moving action from the open position to the closed position and locking the input device upon detection of the first condition within a first time interval based on the electronic device being moved to the closed position.

19 Claims, 7 Drawing Sheets

(56) References Cited

OTHER PUBLICATIONS

The Big Byte, "Ubuntu:How to Automatically Lock & Unlock Screen with Android Phone," retrieved from http://thebigbyte.blogspot.com/2010/02/ubuntu-how-to-automatically-lock-unlock.html, published Feb. 17, 2010, 6 pages.

Techerator, "Keep Your Phone Secure with Auto Lock," retrieved from http://www.techerator.com/2009/11/keep-your-phone-secure-with-auto-lock/, published Nov. 2009, 3 pages.

Bright Hub, "iPhone Auto Lock Settings," retrieved from http://www.brighthub.com/mobile/iphone/articles/50555.aspx, published Sep. 28, 2009, 3 pages.

European Patent Office, "European Search Report," issued in connection with European application serial No. 11173207.9, mailed Nov. 23, 2011, 9 pages.

Canadian Patent Office, "Office Action", issued in connection with CA Patent Application No. 2,779,154, mailed Oct. 9, 2013, 3 pages.

* cited by examiner

SYSTEMS AND METHODS FOR LOCKING AN ELECTRONIC DEVICE

FIELD OF DISCLOSURE

The present disclosure relates to mobile devices, including but not limited to, system and methods for locking an electronic device.

BACKGROUND

Electronic devices, including portable electronic devices, have gained widespread use and may provide a variety of functions including, for example, telephonic, electronic messaging, and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities, etc.

A user typically interacts with a mobile electronic device via an input interface or input device. For example, some electronic devices include a touch sensitive display to allow a user to interact with the electronic device by contacting or touching the icon or image via the touch sensitive display.

To prevent unintentional operation of the electronic device when the electronic device is not in use (e.g., in a user's pocket or purse), some electronic devices include a convenience key or a software enabled lock function (e.g., a lock icon) to lock or disable the input interface of the electronic device. Such a convenience key lock or function is typically manually activated when a user no longer intends to use the electronic device. Habitually using this feature reduces the likelihood of placing accidental phone calls, sending accidental emails or performing any unintended device action(s), prevents unauthorized access to data or functions of the device, etc. However, many users may not be aware of the convenience key lock and/or may not be accustomed to using this feature regularly. In some instances, a user may forget to activate the convenience key lock prior to storing the electronic device in a user's pocket or purse.

Some example electronic devices may include an automatic lock or "sleep mode" after the electronic device detects inactivity for a predetermined period of time. For example, the electronic device may turn off or disable an input device (e.g., a touch screen display) if the electronic device does not receive an input within, for example, two minutes of a last detected input. However, a user may place the electronic device in a pocket or purse in an unlocked condition prior to the expiration of the auto lock time period, which may cause unintentional operation of the electronic device.

In some instances, an electronic device may include a screen that moves (e.g., slides or flips) to expose a physical keyboard positioned underneath the screen. A common action when completing a task is to close or move the screen to a closed position to cover the physical keyboard. A user may associate the closing or sliding action of the electronic device with locking the electronic device when a user moves the screen to a closed position to cover the physical keyboard. In some instances a user may forget or neglect to lock the device before storing the device (e.g., in their pocket, purse, etc.). As a result, a user may store the electronic device in a pocket or purse in an unlocked condition, which may cause an unintentional device action.

DETAILED DESCRIPTION

Figure 1:
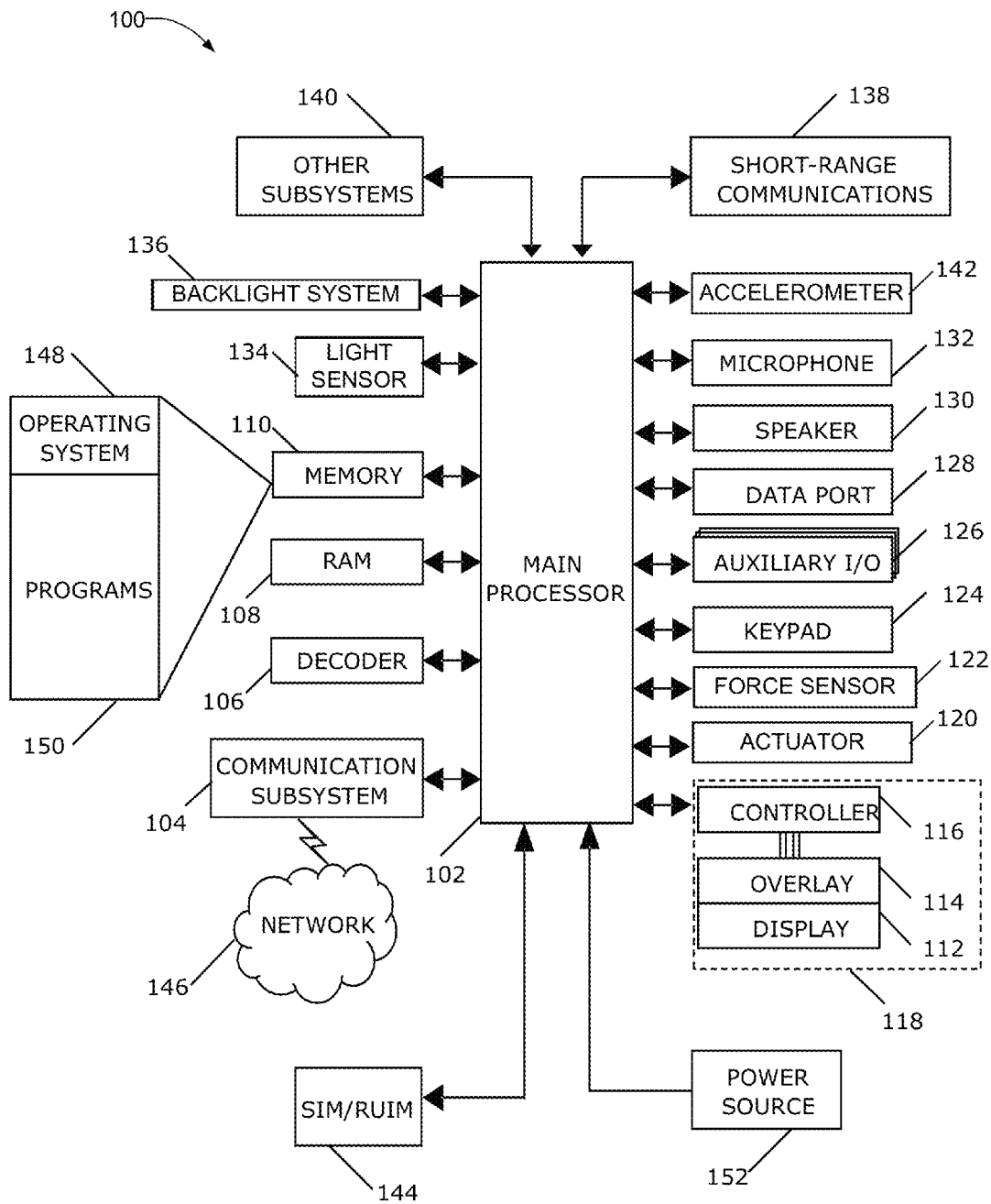
FIG. 1 is a block diagram of an example portable electronic device in accordance with the disclosure.

Example systems and methods disclosed herein can be used to implement a portable electronic device such as, for example, a cellular device having an exposed keypad or touch sensitive screen. In general, the example methods and systems disclosed herein initiate a sleep state or mode based on a detected condition of the electronic device when a user slides, flips or moves a housing of the electronic device from an open position to a closed position. More specifically, when the housing is moved or slid between an open position and a closed position, an example electronic device disclosed herein detects one or more conditions, factors or clues (e.g., heuristics) to determine whether to initiate the sleep mode state (e.g., an accelerated sleep mode state) of the electronic device. Initiating the sleep mode disables or deactivates an input interface or input device upon detection of a condition within a time interval of the electronic device being moved to the closed position.

To determine whether to initiate a sleep mode or condition and disable an input device, an example method or system disclosed herein detects one or more conditions of the electronic device. The one or more conditions may include, for example, detecting an activity level of the input device within a first predetermined time period after a housing of the electronic device is moved to a closed position, detecting a state of the electronic device when the electronic device is moved to a closed position, or after a second predetermined time period (less than the first predetermined time period) after the electronic device is moved to the closed position, and/or detecting a change in ambient light (e.g., a change from light to dark) when the electronic device is moved to a closed position. In some examples, a condition may include detecting a surface area of contact of a touch screen of the device. For example, if substantially the entire screen surface is in contact with an object or a person, an example system described herein may determine that the electronic device is intended to be in a deactivated state (e.g., the device is stored in a pocket or purse). Alternatively, for example, the system detects if multiple touch points of the touch screen are being engaged or touched simultaneously to determine whether to deactivate the device.

In some examples, only one detected condition initiates the sleep condition while, in other examples, a combination of two or more conditions initiates the sleep condition. In other words, the electronic device uses one or more conditions, factors or clues to determine if the device has been put away or is no longer in use within a specific, predetermined time interval.

For example, to detect an activity level of an input device, the electronic device detects or determines if an input is received within a time period of, for example, 10 seconds. If an input is not detected within the time period, the example methods and systems initiate the sleep condition to disable the input device. In some examples, the system may initiate a validation task request if the system is unable to determine if activation of the device was accidental or intentional. For example, a validation task request may request a password such as, for example, a numerical code, a graphical code (e.g., simultaneously touching two dots on a screen, etc. To detect a state of the electronic device when the housing is moved to a closed position, the example methods and systems disclosed herein identify if the electronic device is in a home screen state or a single application dedicated level state (e.g., a user activated application) when the housing of the electronic device is moved from an open position to a closed position. If the electronic device is in a home screen state, the electronic device initiates the sleep condition to disable the input interface. In some examples, detection of the state of the application is determined within a predetermined time interval after detection of the electronic device being moved to the closed position. To detect a change in the ambient light value received, for example, from a light sensor of the electronic device, the electronic device measures or compares a first light value detected when the housing is in the open position and a second light value detected when the housing is in the closed position after a predetermined time period. If the change in light value detected is greater than or equal to a predetermined ambient light value, the system and methods described herein initiate the sleep condition and disable the input interface. Thus, the methods and systems described herein initiate a sleep state based one or more of a detection of an inactivity, a detection of a state of the electronic device and/or a detection of a change in ambient light.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the examples described. The description is not to be considered as limited to the scope of the examples described herein.

The disclosure generally relates to electronic devices such as, for example, a portable electronic device in the examples described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 146. The wireless network 146 may be any type of wireless network, including, but not limited to, data wireless networks, voice wireless networks, and networks that support both voice and data communications. A power source 152, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuator apparatus 120, one or more force sensors 122, a keypad 124, an auxiliary input/output (I/O) subsystem 126, a data port 128, a speaker 130, a microphone 132, a light sensor 134, a backlight system 136, short-range communications 138, an accelerometer 142, and other device subsystems 140. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102.

To identify a subscriber for network access, the portable electronic device 100 uses a Subscriber Identity Module or a Removable User Identity Module (SIM/RUIM) card 144 for communication with a network, such as the wireless network 146. Alternatively, user identification information may be programmed into memory 110.

The portable electronic device 100 includes an operating system 148 and software programs or components 150 that are executed by the processor 102 to implement various applications and are typically stored in a persistent, updatable store such as the memory 110. Additional applications or programs may be loaded onto the portable electronic device 100 through the wireless network 146, the auxiliary I/O subsystem 126, the data port 128, the short-range communications subsystem 138, or any other suitable subsystem 140.

A received signal such as a text message, an e-mail message, or web page download is processed by the communication subsystem 104 and input to the processor 102. The processor 102 processes the received signal for output to the display 112 and/or to the auxiliary I/O subsystem 126. A subscriber may generate data items, for example e-mail messages, which may be transmitted over the wireless network 146 through the communication subsystem 104. For voice communications, the overall operation of the portable electronic device 100 is similar. The speaker 130 outputs audible information converted from electrical signals, and the microphone 132 converts audible information into electrical signals for processing.

Figures 2A, 2B:
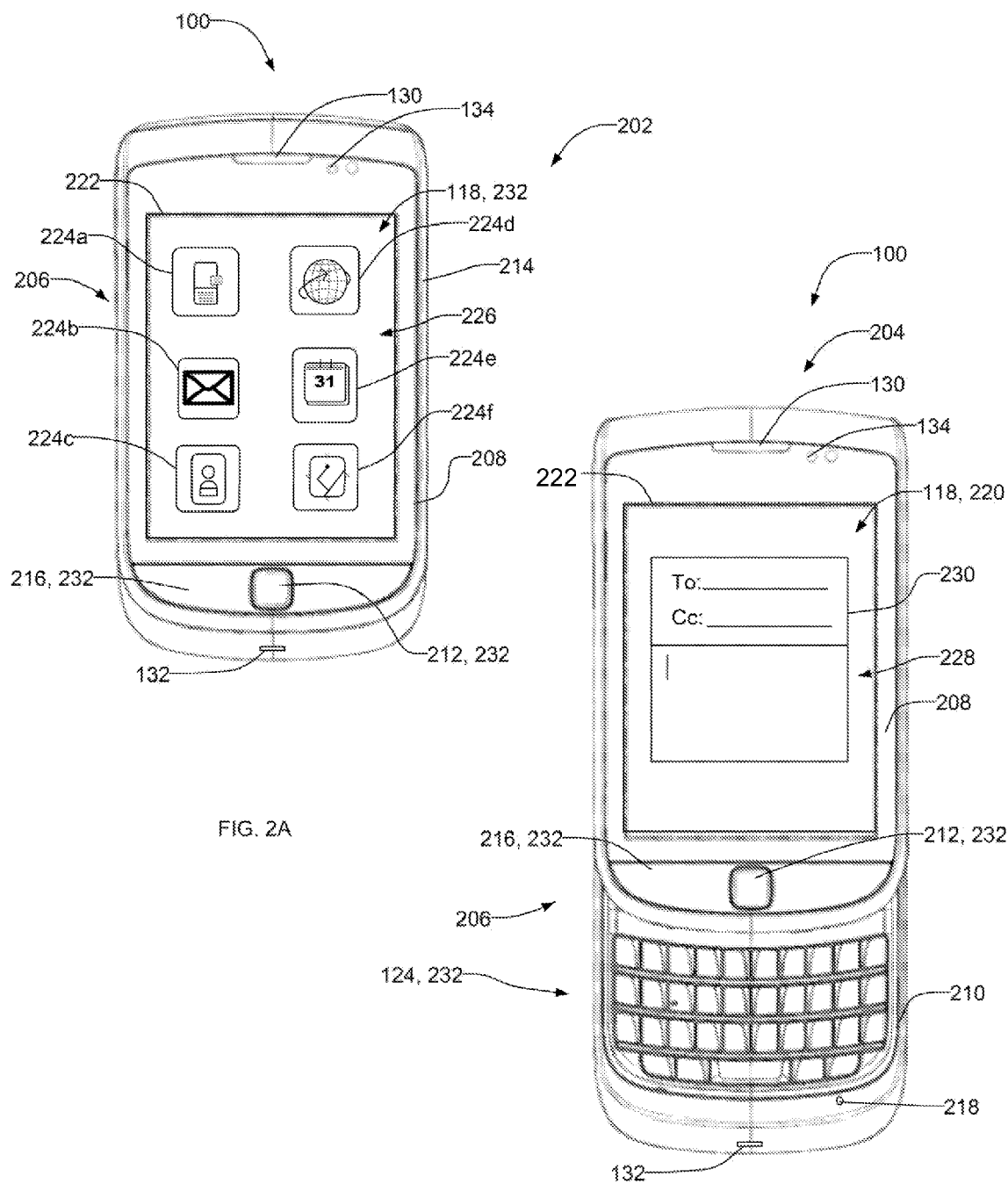
FIG. 2A is an example portable electronic device of FIG. 1 shown in a closed position.
FIG. 2B is the example portable electronic device of FIG. 1 shown in an open position.

FIG. 2A is a front view of the electronic device 100 of FIG. 1 shown in a closed position 202. FIG. 2B is a front view of the electronic device 100 of FIGS. 1 and 2A shown in an open position 204. In the example of FIGS. 2A and 2B, the portable electric device 100 is a handheld communication device or mobile phone. As mentioned above, the electronic device 100 may be a data and/or voice-enabled handheld device that may be used to send and receive a message, a voice communication, a textual entry, etc. Thus, the electronic device 100 may provide a variety of functions including, for example, telephonic, electronic messaging, and other personal information manager (PIM) application functions.

Referring to FIGS. 2A and 2B, the electronic device 100 includes a housing 206 that encloses the electronic or mobile components described above in connection with FIG. 1. For example, the housing 206 encloses the microprocessor 102, the touch screen display 118, the keypad 124 (FIG. 2B), the speaker 130, the microphone 132, the light sensor 134, etc. The housing 206 of the illustrated example can be held in one hand by a user of the electronic device 100 during data (e.g., text) and/or voice communications.

In this example, the housing 206 of the electronic device 100 includes an upper housing portion or lid 208 and a lower housing portion or base 210 (FIG. 2B). The upper housing portion 208 houses the touch screen display 118, and the lower housing portion 210 houses the keypad 124. For example, the keypad 124 may be a QWERTY style keypad or any other suitable type of keypads. In this example, the upper housing portion 208 moves or slides relative to the lower housing portion 210 between the closed position 202 shown in FIG. 2A, at which the upper housing portion 208 substantially aligns with the lower housing portion 210 to cover or hide the keypad 124, and the open position 204 shown in FIG. 2B, at which the upper housing portion 208 at least partially moves away from the lower housing portion 210 to expose the keypad 124.

In this example, to facilitate navigation through menu items, the electronic device 100 of FIGS. 2A and 2B includes an auxiliary input 212. The auxiliary input 212 provides a cursor or navigation tool. In addition to being used as a cursor or navigation tool, the auxiliary input 212 can act as an actuator when the auxiliary input 212 is depressed like a button. The auxiliary input 212 may be a trackpad, a trackball, a touch pad, etc. Although in this example the auxiliary input 212 is disposed within the upper housing portion 208, the auxiliary input 212 may be disposed on any surface of the housing 206 such as, for example, a side surface 214, the lower housing portion 210, etc. In this example, the electronic device 100 also includes one or more action keys 216 adjacent the auxiliary input 212. For example, the action keys 216 may include an on/off button or call end button, a call send button, a menu button, an escape key, etc.

The electronic device 100 includes a sensor or switch 218 (FIG. 2B) to detect a sliding action of the housing 206 of the electronic device 100 from the open position 204 to the closed position 202. The sensor 218 provides a signal to the processor 102, which detects whether the housing 206 is in the closed position 202 or the open position 204. For example, the sensor 218 generates an open or close signal according to the open position 204 or closed positions 202. The processor 102 processes the signal received by the sensor 218 and determines if the housing 206 is in the open position 202 or the closed position 204. For example, the sensor or switch 218 may include, but is not limited to, a Hall sensor, an optical sensor, an electromagnetic switch, a contact switch, a mechanical switch, etc.

To enable a user to interact with the electronic device 100, the electronic device 100 includes a graphic user interface 220 (GUI) controlled by, for example, the operating system 148 (FIG. 1). Generally, the GUI 220 is used to convey information and receive commands from a user, and includes a variety of GUI objects or controls that include, for example, icons, toolbars, drop-down menus, pop-up menus, text, dialog boxes, buttons, etc. In other words, the GUI 220 provides a display format providing information to a user and enables the user to choose commands, execute application programs, manage computer files, and/or perform other functions by selecting menu items or pictorial representations (e.g., icons).

In the illustrated example of FIG. 2A, the GUI 220 provides a window 222 in which a user may view a menu item (i.e., an icon), an application (e.g., an app) and/or a document. As shown in FIG. 2A, multiple menu items or icons 224*a-f* are displayed in the window 222. More specifically, in the illustrated example, the GUI 220 presents the menu items or icons 224*a-f* in an icon state or home screen state 226. The display 112 presents the home screen state 226 (e.g., a home screen) to enable a user to select or choose from the menu items or icons 224*a-f* each being representative of different applications and/or event notifications. Although in some instances the home screen state 226 may be a single level dedicated application, the home screen state 226 presents options to enable a user to select or choose from a variety of different applications and/or event notifications.

FIG. 2B illustrates a single application dedicated level 228 displayed in the window 222. More specifically, in the illustrated example, the GUI 220 is displaying or presenting an action input 230 associated with an email application in the single application dedicated level 228 to enable the user to compose an email communication. Also, although not shown, the GUI 220 can display the single application dedicated level 228 when the electronic device 100 is in the closed position of FIG. 2A and the GUI 220 can display the home screen 226 when the electronic device 100 is in the open position 204 of FIG. 2B.

A user typically interacts with the GUI 220 via an input device or input interface 232. In this example, the input device or input interface 232 includes the touch screen display 118, the auxiliary input 212, the keypad 124, and/or the function keys 216. For example, a user can navigate through the menu items 224*a-f* and can select or highlight an application or icon presented by the GUI 220 via the auxiliary input 212, the keypad 124, the touch screen display 118, etc. Some example applications that may be displayed as icons or provided as single application dedicated levels by the GUI 220 include, but are not limited to, an event notification (e.g., a newly received email), an email application, a text message application, a multi-media message (MMS) application, an instant message (IM) application, BlackBerry® messenger (Bbm™) application, a voice mail application, a task application, a calendar application, a navigation application, an internet (e.g., a web-surfing) application, an alarm application, a contact application, etc.

Figure 3A:
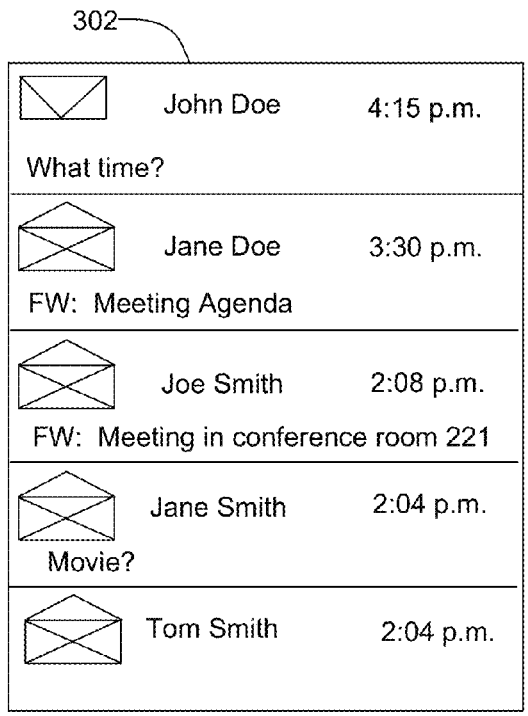
FIG. 3A illustrates an example web browser application disclosed herein in an active state.
Figure 3B:
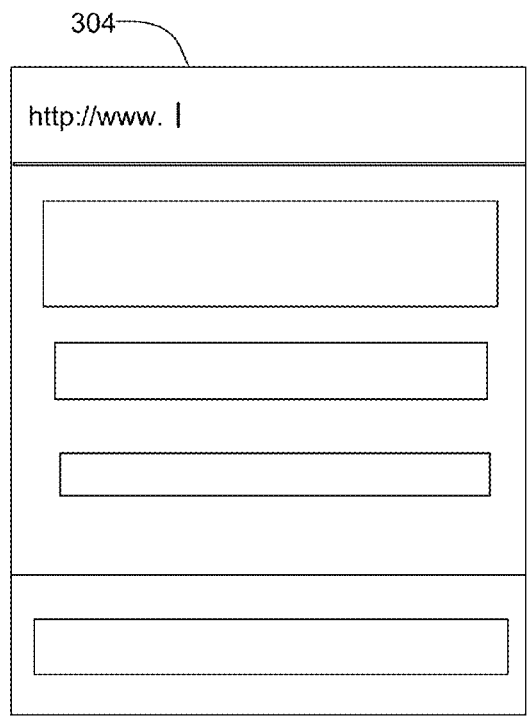
FIG. 3B illustrates an example email application disclosed herein in an active state.

For example, FIGS. 3A and 3B illustrate other example single application dedicated levels that can be displayed via the GUI 220 when the electronic device 100 is in the closed position 202 and/or the open position 204. FIG. 3A illustrates an example single application dedicated level 302 presenting a list of email communications provided by an email application. For example, as shown in FIG. 3A, a user can navigate through menu items of an email application or program to the level 302. FIG. 3B illustrates an example single application dedicated level 304 presenting a web page provided by a web browser application. In general, a single application dedicated level may be any other suitable input field, display field, etc. being displayed via the GUI 220 that is associated with a particular application such as the example applications indicated above.

Thus, when the electronic device 100 is in the closed position 202 as shown in FIG. 2A, a user can fully interact with the electronic device 100 without having to move the housing 206 to the open position 204. For example, a user may place a telephonic call, view the internet, read and/or send email, view and/or send a text message, view and/or edit a calendar, etc. Thus, when the electronic device 100 is in the closed position 202, a user may select a menu item or icon to select a desired application or command. A virtual keypad may be provided via the touch screen display 118 to enable a user to input information when the electronic device 100 is in the closed position 202.

Additionally or alternatively, when the electronic device 100 is in the open position 204, a user can interact with the electronic device 100 by selecting menu items or icons via the keypad 124 to choose commands, execute application programs, and/or perform other functions. Additionally, in the open position 204, a user may also interact with the electronic device 100 via with the touch screen display 118, the auxiliary input 212 and/or the function keys 216, in combination with the keypad 124.

Referring to FIGS. 2A and 2B, the electronic device 100 also includes the backlight system 136 (FIG. 1) for illuminating the touch screen display 118 to provide a background light or color over menu items, text or images being displayed and/or to illuminate keys of the keypad 124. To provide or adjust a lighting or illumination of the touch screen display 118 and/or illumination of the keypad 124, the backlight system 136 employs the ambient light sensor 134. The ambient light sensor 134 measures or senses ambient light values of the device environment and sends the ambient light values to the backlight system 136 and/or processor 102. The backlight system 136 processes the ambient light level value sensed by the ambient light sensor 134 to adjust (e.g., lighten or darken) an intensity of the backlight provided to the touch screen display 118 and/or the keys of the keypad 124 based on the detected ambient light levels of the device environment.

To prevent unintentional operation of the electronic device when the electronic device is not in use (e.g., in a user's pocket or purse), the electronic device 100 may include a convenience key (not shown) or a software enabled lock function (e.g., a lock icon) to disable or lock the input device or input interface 232 (i.e., the operation of the electronic device 100). For example, the convenience key lock is manually activated when a user no longer intends to use the electronic device 100 to reduce the likelihood of placing accidental or unintentional phone calls, sending accidental emails or performing any unintended device action. In some instances, however, a user may forget to activate the convenience key lock prior to storing the electronic device 100 in a user's pocket or purse.

Additionally, in the illustrated example, a user may associate the sliding action of the housing 206 of the electronic device 100 with locking the input interface 232 of the electronic device 100 when a user moves the screen 118 to the closed position 202 to cover the keyboard 124. As a result, a user may store the electronic device 100 in a pocket or purse in an unlocked condition, which may cause an unintentional device action.

To reduce the likelihood of performing an unintentional device action (e.g., placing a call) when a user fails to manually activate convenience key lock, some known electronic devices include a default sleep mode or lock that automatically disables an input interface after the electronic device detects inactivity for a predetermined period of time (e.g., 2 minute duration). The predetermined period of time may be user configurable. Thus, some known electronic devices remain in awake mode until the electronic device does not receive an input within, for example, two minutes of a detected input activity. However, an unintentional device action (e.g., a phone call) may occur when a user places the electronic device in a pocket or purse in an unlocked condition prior to the activation of the default sleep mode. In other words, a user that immediately stores the electronic device within a pocket or purse after sliding the housing from an open position to a closed position risks placement of an unintentional device action because the input device or interface remains in an active or enabled state for a duration of time (e.g., 2 minutes) prior to activation of the default mode.

To prevent unintentional device action(s) prior to activation of the sleep mode, the example electronic device 100 detects or determines whether the input interface 232 should be disabled based on one or more conditions described below. In other words, the electronic device 100 detects whether a user has completed using the electronic device 100 and activates a sleep state or mode to disable the input interface 232 (e.g., the touch screen display 118, physical key functions such as a send key, etc.) when the electronic device 100 detects conditions that indicate a user is no longer using the electronic device 100. As a result, the example electronic device 100 significantly reduces the likelihood of unintentional device actions when a user stores the electronic device 100 in a purse or pocket when a manual lock is not activated. Simply disabling the input interface 232 when the housing 206 is moved to the closed position 202 may frustrate a user who would like to continue using the electronic device 100 when the housing 206 is in the closed position 202.

To determine if the input interface 232 should be disabled, the electronic device 100 detects one or more conditions described in greater detail below in connection with FIGS. 4-7. The electronic device 100 detects one or more conditions or clues to activate the sleep mode with a greater degree of confidence that a user is no longer using the electronic device 100.

For example, a user can activate or open a web browser application when the electronic device 100 is in the closed position 202 (e.g., via a touch screen display 118) and the user can then open the slider or housing 206 of the electronic device 100 to expose the keypad 124 to type a web address or URL. After the user types a URL via the keypad 124, the user may slide the housing 206 back to the closed position 202 and continue to browse the webpage via the web browser application. In such an instance, the example electronic device 100 does not initiate a sleep state because the electronic device 100 determines that the user wants to continue using the electronic device 100 after the slider or housing 206 is moved to the closed position 202. Instead, the example electronic device 100 remains in an awake mode to enable user interaction via the input device 232. In this example, the electronic device 100 may activate or initiate the sleep condition after detection of one or more conditions of the electronic device 100 indicating that a user is no longer using the device 100.

In another example, a user may open an email message or communication via an email application. A user may slide the housing 206 to the open position 204 to expose the keypad 124, compose a new email communication and send it. The user then slides the housing 206 to the closed position 202 and stores the electronic device 100 in a pocket or purse. In such an instance, the electronic device 100 detects that the user no longer wishes to use the electronic device 100 and activates or initiates a sleep state to disable the input device 232. In such an example, the example electronic device 100 significantly reduces the likelihood of unintentional device actions.

Figure 4:
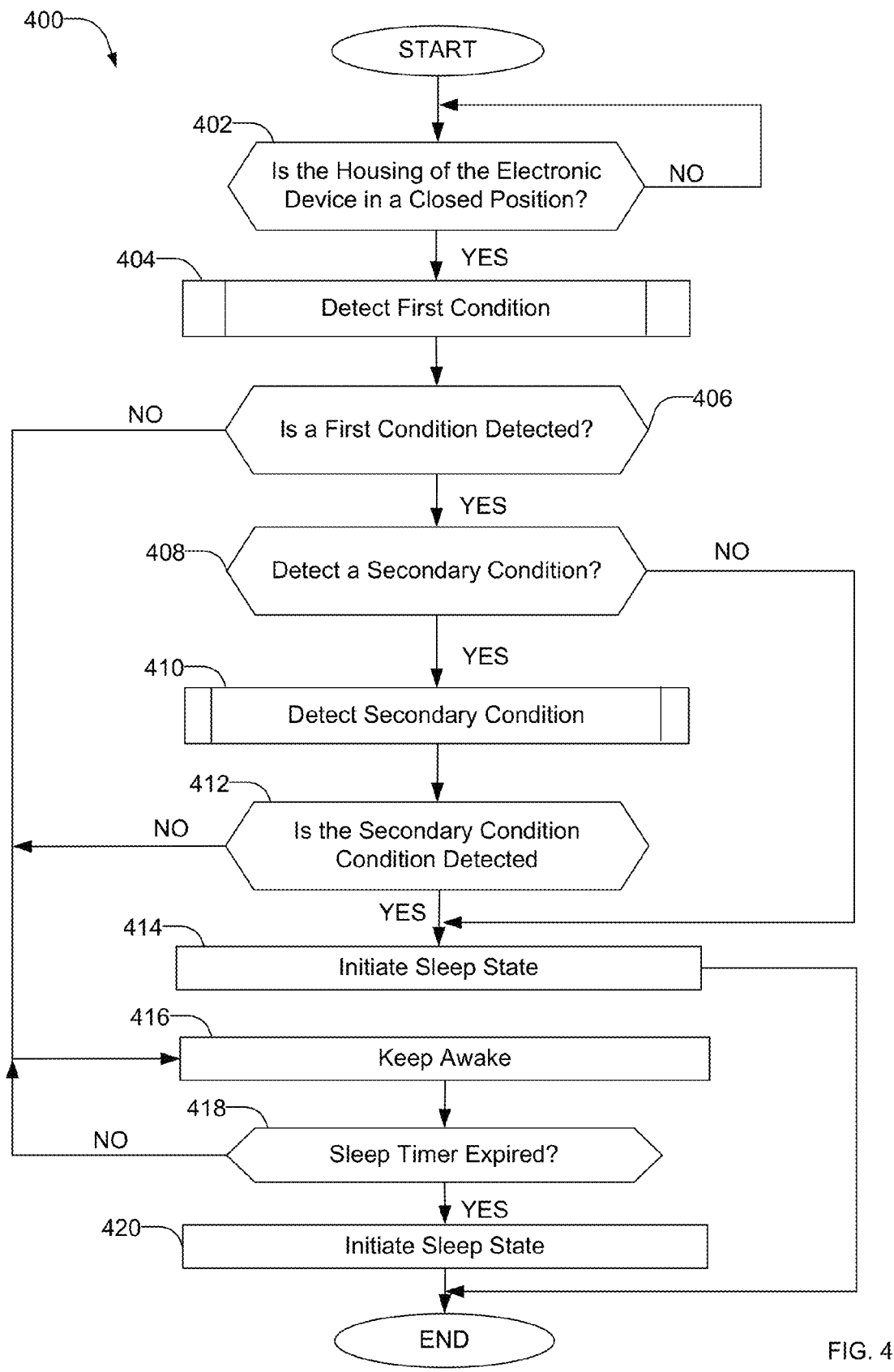
FIG. 4 is a flowchart representative of example machine readable instructions that may be executed to implement example systems and methods to lock the example portable electronic devices of FIGS. 1, 2A, 2B.

FIG. 4 is a flow diagram illustrating example machine readable instructions 400 which may be executed to initiate a sleep state or lock condition of the input device or input interface 232 of the electronic device 100 when a sliding action of the housing 206 is detected from the open position 204 to the closed position 202. While an example system 400 has been illustrated in FIG. 4, one or more of the steps and/or processes illustrated in FIG. 4 may be combined, divided, re-arranged, omitted, eliminated and/or implemented in any other way. Further still, the example system of FIG. 4 may include one or more processes and/or steps in addition to, or instead of, those illustrated in FIG. 4, and/or may include more than one of any or all of the illustrated processes and/or steps. Further, although the example system is described with reference to the flow chart illustrated in FIG. 4, many other methods of locking the electronic device 100 of FIGS. 1, 2A and 2B may alternatively be used.

Referring to FIG. 4, the system 400 monitors whether the housing 206 of the electronic device 100 is in the closed position 202. For example, the system 400 detects or receives an input representative of the housing 206 moving or sliding from the open position 204 shown in FIG. 2B to the closed position 202 shown in FIG. 2A (block 402). To detect a sliding action of the housing 206 from the open position 204 to the closed position 202, the system 400 may receive a signal(s) from the sensor or switch 218. If the housing 206 is not in the closed position 202, then the system 400 continues to monitor for movement of the housing 206 between the open position 204 and the closed position 202.

If the system 400 detects a sliding action of the housing 206 from the open position 204 to the closed position 202, the system 400 runs or executes a process (e.g., the process 500, 600 or 700 of FIGS. 5-7) to detect a first condition of the electronic device 100 (block 404). For example, a first condition may be detection of an inactivity level 500 as described below in FIG. 5, detection of a state 600 of the electronic device 100 as described below in FIG. 6, or detection of a change in ambient light 700 as described below in FIG. 7. The system 400 determines if the first condition is detected (block 406). In some examples, the system 400 detects a first condition of the electronic device at block 404 within a predetermined time interval after detection of the moving action to the closed position.

In the illustrated example of FIG. 4, the example system 400 may optionally be configured to detect a second condition of the electronic device 100 to determine whether to initiate the sleep state or lock condition (block 408). For example, the system 400 may be configured to detect the second condition via a setting menu of the electronic device 100. Thus, the electronic device 100 detects the second condition in addition to detecting the first condition when the electronic device 100 detects a sliding action of the housing 206 from the open position 204 to the closed position 202. Thus, if the system 400 is configured to detect a second condition, the system 400 determines whether to detect the second condition when the first condition is detected at block 406 (block 408).

If the system 400 is configured to detect the second condition (block 408), the system 400 then runs or executes a process (e.g., the process 500, 600 or 700 of FIGS. 5-7) to detect the second condition (block 410). For example, the system 400 may run the process at block 410 to detect a second condition such as, for example, detection of an inactivity level 500 as described in FIG. 5, detection of a state 600 of the electronic device 100 as described in FIG. 6, or detection in a change of ambient light 700 as described below in FIG. 7.

The system 400 determines whether the second condition is present or detected prior to initiating a sleep state (block 412). Thus, if the system 400 is configured to detect the second condition at block 408, the system 400 will not initiate the sleep state unless both the first and the second conditions are detected at blocks 406 and 412, respectively. If the first and second conditions are detected at blocks 406 and 412, respectively, the system 400 initiates the sleep state (block 414).

If the system 400 is not configured to detect the second condition at block 408, then the system 400 initiates the sleep mode if the system 400 detects the first condition at block 406 (block 414). Thus, if the system 400 is not configured to detect the second condition at block 408, the system 400 initiates the sleep mode at block 414 when a first condition is detected at block 406. The sleep state, for example, can be configured to disable or turn off the input interface or input device 232 within 10 seconds of the housing 206 moving to the closed position 202 if the first condition is detected. Thus, if a user places the electronic device 100 in a pocket or purse, the system 400 initiates the sleep state to disable the input interface 232 (e.g., the touch screen display 118) when the first condition is detected at block 408 (e.g., an inactivity level is detected within 10 seconds of the housing 206 being in the closed position 202).

If the first condition is not detected at block 406 and/or the second condition is not detected at block 412 when the system 400 is configured to detect the second condition at block 408, the system 400 keeps or maintains the electronic device 100 in an awake state or mode (block 416). As noted above, in the awake state, the system 400 maintains or keeps the input device or user interface 232 in an active state to enable user interaction or input with the electronic device 100. The system 400 maintains the electronic device 100 in the awake state at block 416 until a sleep timer has expired (block 418). For example, the system 400 maintains the awake state until the system 400 detects that an input has not been received over a predetermined time period set (e.g., 10 seconds). Thus, the system 400 maintains the electronic device 100 in the awake mode when the sleep timer has not expired (block 418).

If the sleep timer has expired and the system 400 has not received an input over the duration of the sleep timer of the sleep mode, the system 400 initiates the sleep mode (block 420).

Additionally or alternatively, although not shown, the system 400 of FIG. 4 may be configured to detect a third condition, or a plurality of conditions, in addition to detection of the first and second conditions to determine whether to initiate the sleep state. For example, the system 400 may be configured to initiate a sleep state only upon detection of all the conditions 500, 600 and 700 illustrated in FIGS. 5-7 when the system 400 detects the sliding action of the electronic device 100 from the open position 204 to the closed position 202. The more conditions that are detected by the system 400, the greater the accuracy at which the electronic device 100 activates the sleep state.

Figure 5:
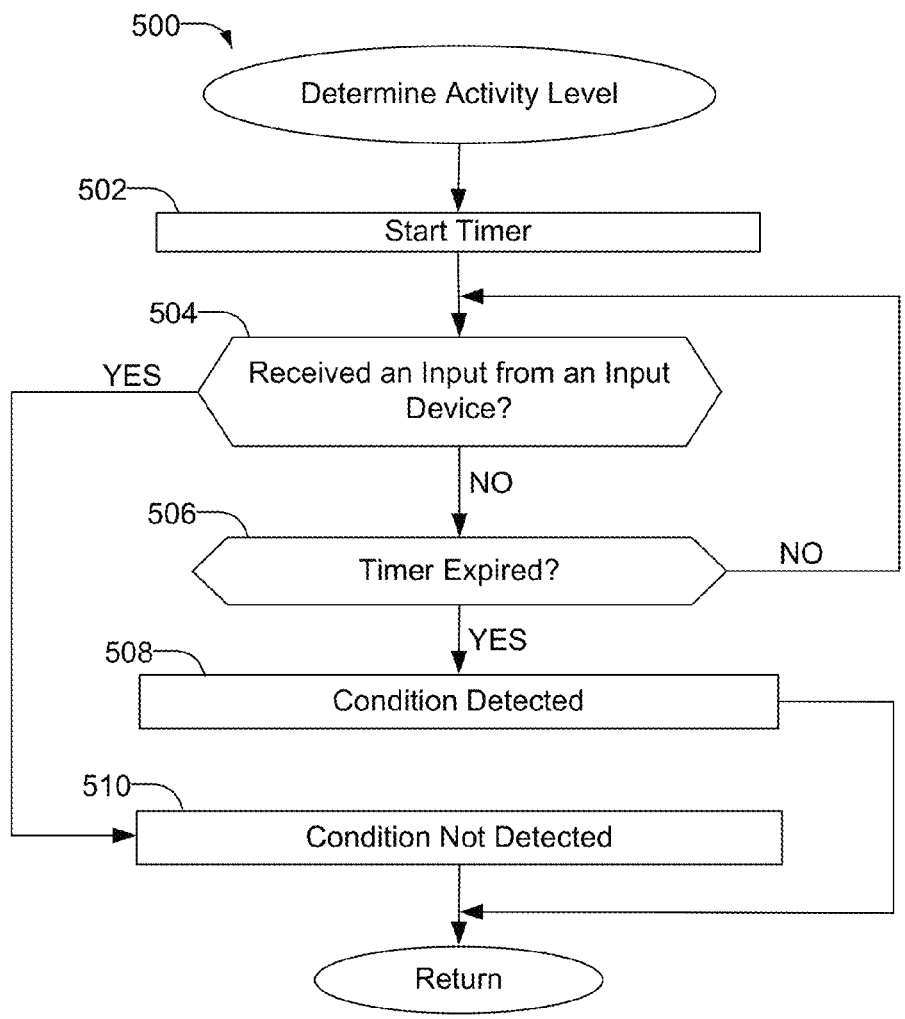
FIG. 5 is a flowchart representative of an example process of FIG. 4 to determine an activity level of the electronic device of FIGS. 1, 2A and 2B.

FIG. 5 is a flow diagram illustrating example machine readable instructions 500 which may be executed to detect the first condition at block 404 or the second condition at block 410. In particular, the example flow diagram illustrates detecting an activity level to initiate a sleep state or lock condition of the input device or input interface 232 of the electronic device 100 when the housing 206 of the electronic device 100 is moved between the open position 204 and the closed position 202. While an example system 500 has been illustrated in FIG. 5, one or more of the steps and/or processes illustrated in FIG. 5 may be combined, divided, re-arranged, omitted, eliminated and/or implemented in any other way. Further still, the example system of FIG. 5 may include one or more processes and/or steps in addition to, or instead of, those illustrated in FIG. 5, and/or may include more than one of any or all of the illustrated processes and/or steps. Further, although the example system is described with reference to the flow chart illustrated in FIG. 5, many other methods of locking an electronic device 100 of FIGS. 1, 2A and 2B may alternatively be used.

Referring to FIG. 5, the process 500 initiates a timer when the system 400 of FIG. 4 detects a sliding action of the electronic device 100 between the open position 204 and the closed position 202 (block 502). When the housing 206 is in the closed position, the process 500 detects whether a signal representative of an input from an input device is received (block 504).

If the process 500 detects a lack of activity or inactivity (i.e., does not receive a signal representative of an input from the input device or interface 232), the process 500 determines if a sleep state has expired (block 506). If the sleep state timer has not expired at block 506, the process returns to block 504 (block 506). If the sleep timer has expired at block 506, the system 500 determines that the condition is detected (block 508). The process 500 then returns to block 404 if the process 500 is configured as the first condition or the process 500 returns to block 408 if the process 500 is configured as the second condition.

When a signal representative of an input is detected, the process 500 determines that the condition is not detected (block 510). The process 500 then returns to block 404 if the process 500 is configured as the first condition or the process returns to block 410 if the process 500 is configured as the second condition.

Figure 6:
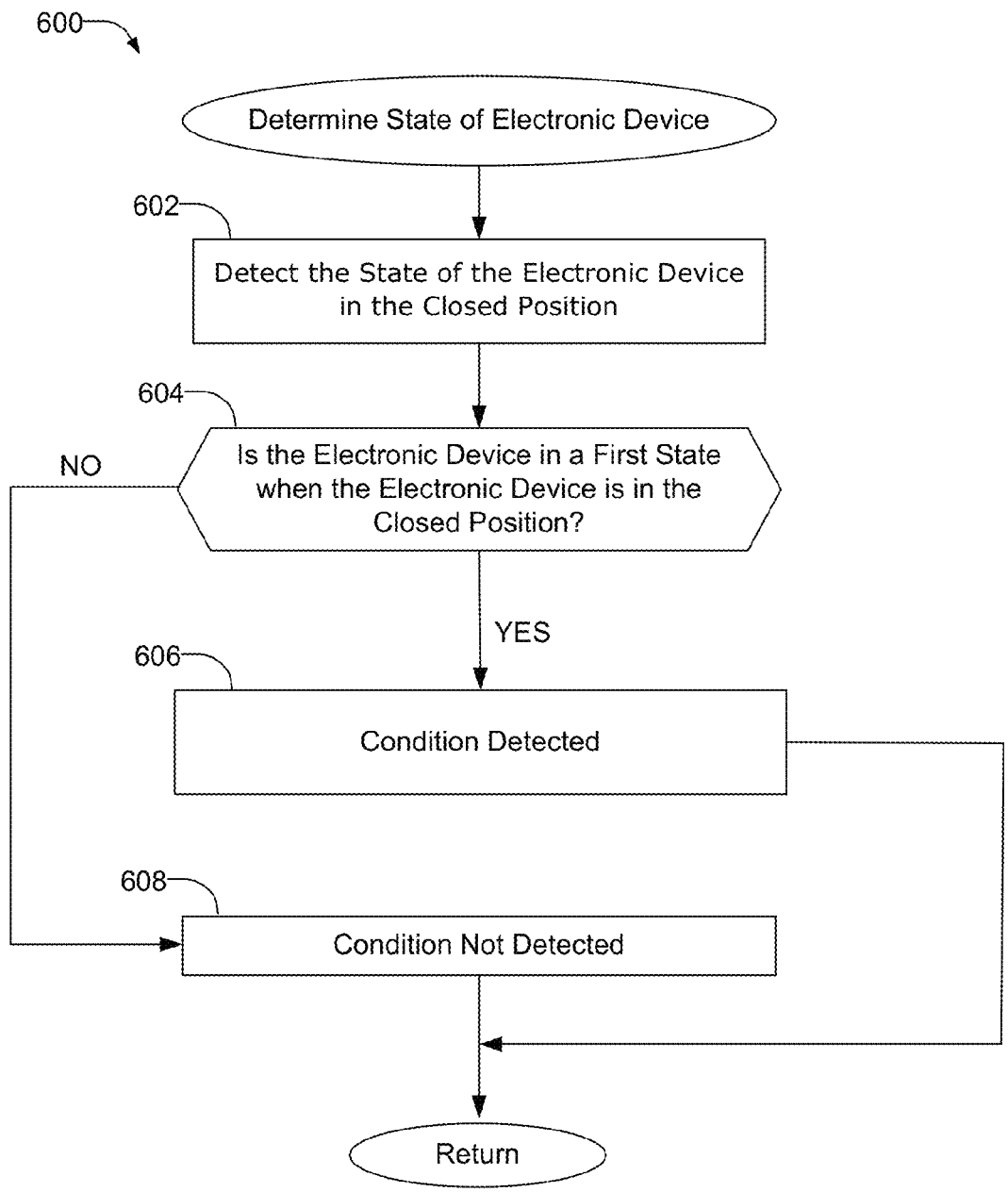
FIG. 6 is a flowchart representative of an example process of the example flowchart of FIG. 4 to determine a state of the electronic device of FIGS. 1, 2A and 2B.

FIG. 6 is a flow diagram illustrating example machine readable instructions 600 which may be executed to detect the first condition at block 404 or the second condition at block 410. In particular, the example flow diagram of FIG. 6 illustrates detecting a state 600 of the electronic device 100 to initiate a sleep state to lock or disable the input device or input interface 232 of the electronic device 100 when the housing 206 of the electronic device 100 is moved between the open position 204 and the closed position 202. While an example system 600 has been illustrated in FIG. 6, one or more of the steps and/or processes illustrated in FIG. 6 may be combined, divided, re-arranged, omitted, eliminated and/or implemented in any other way. Further still, the example system of FIG. 6 may include one or more processes and/or steps in addition to, or instead of, those illustrated in FIG. 6, and/or may include more than one of any or all of the illustrated processes and/or steps. Further, although the example system is described with reference to the flow chart illustrated in FIG. 6, many other methods of locking an electronic device 100 of FIGS. 1, 2A and 2B may alternatively be used.

Referring to FIG. 6, the process 600 detects the state of the electronic device 100 when the system 400 of FIG. 4 detects a sliding action of the electronic device 100 between the open position 204 and the closed position 202 (block 602). When the housing 206 is in the closed position 202, the process 600 detects whether the electronic device 100 is in a first state (block 604). For example, the first state may be the home screen state 226 shown above in FIG. 2A. A second state may be the single application dedicated level 230, 302 and 304 shown in respective FIGS. 2B, 3A and 3B. If the electronic device 100 is in the first state (e.g., the home screen state 226) when the electronic device 100 is in the closed position 202, then the process 600 detects a condition (block 606). The process 600 then returns to block 404 of FIG. 4 if the process 600 is configured as the first condition or the process 600 returns to block 410 of FIG. 4 if the process 600 is configured or representative of the second condition. In some examples, the process 600 may detect the state of the electronic device (e.g., a first state, a second state, etc.) within a predetermined time interval after detection of the electronic device 100 being moved to the closed position.

If the process 600 does not detect that the electronic device 100 is in the first state at block 604, the process 600 determines that the condition is not detected (block 608). For example, the process 600 determines that a condition is not detected at block 604 when the electronic device 100 is in the single application dedicated level 230, 302 or 304 when the system 400 detects the sliding action of the housing 206 from the open position 204 to the closed position 202. The process 600 then returns to block 404 of FIG. 4 if the process 600 is configured as the first condition or the process 600 returns to block 410 of FIG. 4 if the process 600 is configured as the second condition.

Figure 7:
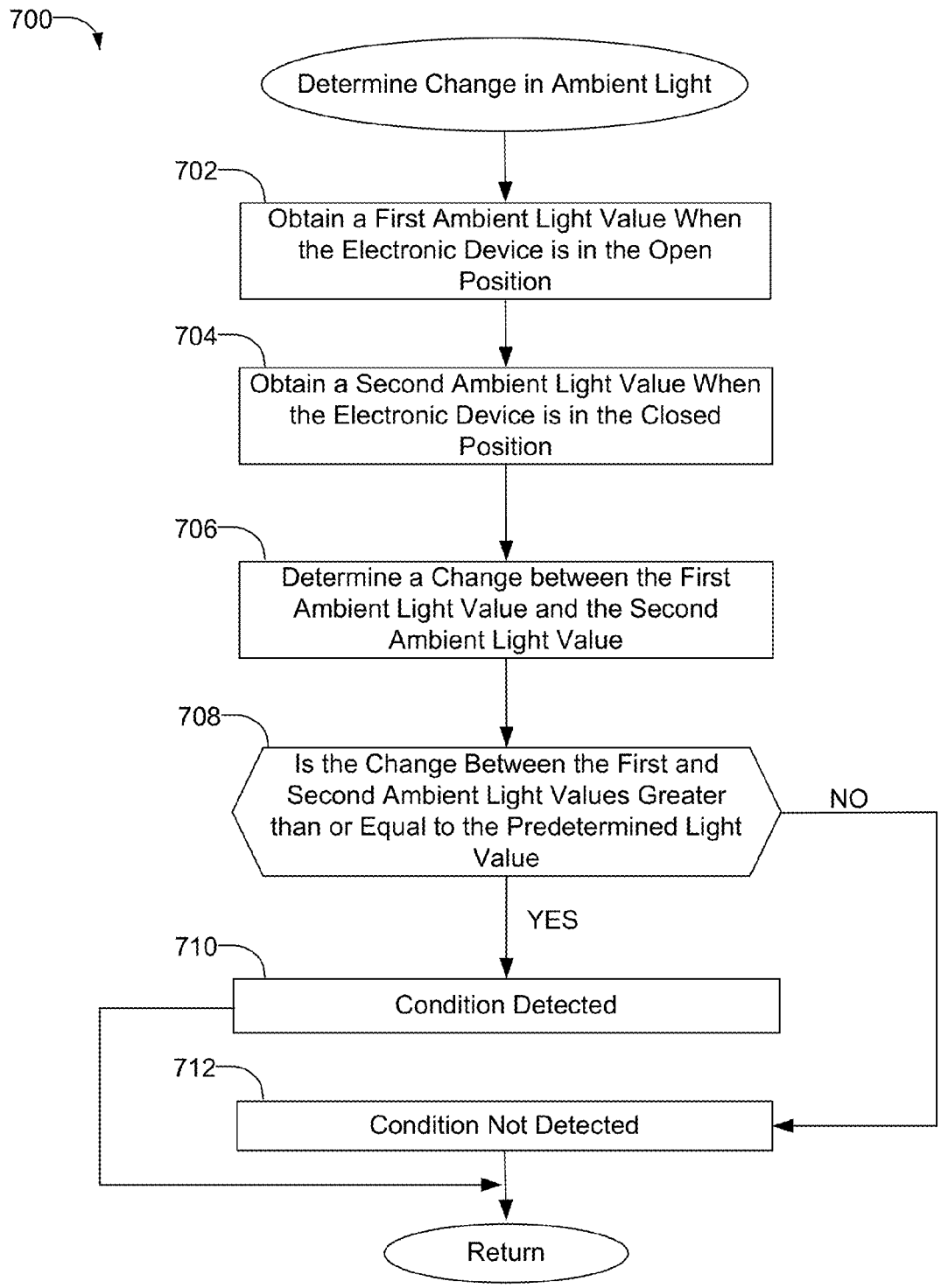
FIG. 7 is a flowchart representative of an example process of the example flowchart of FIG. 4 to determine a change in ambient light of the electronic device of FIGS. 1, 2A and 2B.

FIG. 7 is a flow diagram illustrating example machine readable instructions 700 which may be executed to detect the first condition at block 404 or the second condition at block 410. In particular, the example flow diagram of FIG. 7 illustrates detecting a change of ambient light in the environment of the electronic device 100 to initiate a sleep state to lock or disable the input device or input interface 232 of the electronic device 100 when the housing 206 of the electronic device 100 is moved between the open position 204 and the closed position 202. While an example system 700 has been illustrated in FIG. 7, one or more of the steps and/or processes illustrated in FIG. 7 may be combined, divided, re-arranged, omitted, eliminated and/or implemented in any other way. Further still, the example system of FIG. 7 may include one or more processes and/or steps in addition to, or instead of, those illustrated in FIG. 7, and/or may include more than one of any or all of the illustrated processes and/or steps. Further, although the example system is described with reference to the flow chart illustrated in FIG. 7, many other methods of locking an electronic device 100 of FIGS. 1, 2A and 2B may alternatively be used.

Referring to FIG. 7, the process 700 detects a change in ambient light of the electronic device 100 when the system 400 of FIG. 4 detects a sliding action of the electronic device 100 between the open position 204 and the closed position 202. In particular, the process 700 obtains a first ambient light value when the electronic device 100 is in the open position 204 (block 702). For example, the process 700 receives the first ambient light signal or value from the light sensor 134 when the housing 206 is in the open position 204 and sends it to the processor 102. In some examples, the process 700 stores the first light value in the memory 110 of FIG. 1.

The process 700 obtains a second ambient light value when the housing 206 is in the closed position 202 (block 704). For example, the process 700 receives the second ambient light signal or value from the light sensor 134 when the housing 206 is in the closed position 202. In some examples, the process 700 stores the second ambient light value in the memory 110 of FIG. 1.

The process 700 determines a change between the first ambient light value and the second ambient light value (block 706). To determine the change between the first and second ambient light values, the process 700 may employ a comparator (not shown). The comparator may receive the first and second ambient light values from the light sensor 134. Alternatively, the comparator may retrieve the first and second ambient light valves from the memory 110 of FIG. 1.

The process 700 then determines if the change detected between the first and second ambient light values is greater than or equal to a predetermined light value (block 708). If process 700 detects a change in the ambient light value that is greater than the predetermined light value, the process 700 determines a condition detected (block 710). For example, the process 700 detects a condition when any significant change in ambient light value in the environment of the electronic device 100 is detected between the open position 204 and the closed position 202. A predetermined ambient light value may be a light value greater than 1, "0" representing detection of substantially no light and "1" representing detection of a great amount of light. In contrast to detecting the ambient light value of the device environment when the electronic device 100 is in the closed position 202, measuring a change between the ambient light values of the device environment between the open position 204 and the closed position 202 provides greater accuracy when determining to initiate the sleep state. For example, detecting a change in ambient light does not cause detection of a condition when a user is using the electronic device 100 in a dark environment when the housing 206 is in the open position 204 and the closed position 202. Detecting only the device environment when the housing 206 is the closed position 202 may cause detection of the condition even if the user was using the electronic device 100 in a dark environment when the housing 206 was in the open position 204. Of course, the process 700 may be configured to detect the ambient light value or the device environment when the housing 206 is in the closed position 202 to detect the condition.

The process 700 then returns to block 404 of FIG. 4 if the process 700 is configured as the first condition or the process 700 returns to block 410 of FIG. 4 if the process 700 is configured or representative of the second condition.

If the process 700 does not detect that the change between the first and second ambient light values is greater than or equal to the predetermined value at block 708, the process 700 determines that the condition is not detected (block 712). The process 700 then returns to block 404 of FIG. 4 if the process 700 is configured as the first condition or the process 700 returns to block 410 of FIG. 4 if the process 700 is configured as the second condition (block 714).

Another example condition that may be used to determine whether to deactivate the electronic device 100 may include detection of a surface contact area of the touch screen 118. For example, if substantially the entire screen surface is in contact with an object or a person (e.g., substantially the entire touch screen 118 is in contact with a person), an example system described herein may determine that the electronic device 100 is intended to be in a deactivated state (e.g., the electronic device 100 is stored in a pocket or purse). Alternatively, for example, the system may detect if multiple touch points of the touch screen 118 are being engaged or touched simultaneously to determine whether to deactivate the electronic device 100.

Thus, the example methods and systems disclosed herein detect one or more conditions, factors or clues (e.g., heuristics) to determine whether to deactivate an input device (e.g., a user interface) of an electronic device. As a result, the example systems and methods described herein may determine to deactivate an input device of the electronic device prior to the expiration of a predetermined timer often used in known electronic devices. In this manner, the example systems and methods described herein can detect whether the electronic device is in a non-use condition (e.g., in a pocket or a purse) and deactivate an input device to prevent unintended use of the electronic device. For example, a system described herein detects a moving action of a housing of an electronic device from an open position to a closed position. The system disables, locks, or deactivates an input interface or input device of the electronic device upon detection of a condition within a time interval of the electronic device being moved to the closed position.

The methods described herein may be carried out by software executed, for example, by the processor 102. Coding of software for carrying out such a method is within the scope of a person of ordinary skill in the art given the present description. A computer-readable medium having computer-readable code may be executed by at least one processor of the portable electronic device 100 to perform the methods described herein.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method for locking an input device of an electronic device, the method comprising:
   detecting a moving action of a housing of the electronic device from an open position to a closed position;
   initiating a sleep timer;
   detecting a first condition of the electronic device after detection of the moving action from the open position to the closed position and prior to an expiration of the sleep timer;
   detecting at least a second condition of the electronic device prior to the expiration of the sleep timer if the first condition is detected; and
   locking the input device upon detection of the first condition and the second condition prior to the expiration of the sleep timer.

2. The method of claim 1, wherein detecting the first condition or the second condition prior to the expiration of the sleep timer.

3. The method of claim 2, wherein detecting the first condition or the second condition comprises detecting a state of the electronic device when the electronic device is in the closed position, wherein detecting the state of the electronic device comprises determining whether the electronic device is in a home screen state or a single application dedicated level state.

4. The method of claim 3, further comprising presenting one or more menu icons via the home screen state when the electronic device is in the closed position, and locking the input device when the electronic device is in the home screen state.

5. The method of claim 1, wherein detecting the first condition or the second condition comprises detecting whether substantially an entire screen surface of the electronic device is in contact with an object or a person.

6. The method of claim 1, wherein the first condition or the second condition comprises comparing a change in a first ambient light value detected when the electronic device is in the open position and a second ambient light value detected when the electronic device is in the closed position.

7. The method of claim 1, further comprising detecting a third condition and locking the input device when the first condition, the second condition and the third condition are detected, wherein detecting the first condition comprises at least one of detecting an inactivity level within a predetermined time interval, detecting a state of the electronic device, detecting a change in an ambient light value being greater than or equal to a predetermined ambient light value, and detecting a surface contact area of a touch screen of the electronic device, detecting the second condition comprises at least another one of detecting the inactivity level, detecting the state of the electronic device, detecting the change in an ambient light value being greater than or equal to the predetermined ambient light value, and detecting the surface contact area of the touch screen of the electronic device, and detecting the third condition comprises at least another one of detecting the inactivity level, detecting the state of the electronic device, detecting the change in the ambient light value being greater than or equal to the predetermined ambient light value, and detecting the surface contact area of a touch screen of the electronic device.

8. A method for locking an input device of an electronic device comprising:
: initiating a sleep timer;
: monitoring an input device for detection of a first condition and a second condition prior to an expiration of the sleep timer when the electronic device is moved from an open position to a closed position; and
: initiating a sleep state to lock the input device upon detecting the first and second conditions prior to the expiration of the sleep timer.

9. The method of claim 8, wherein initiating the sleep state disables the input device.

10. The method of claim 8, further comprising detecting a state of the electronic device when the electronic device is moved to a closed position.

11. The method of claim 8, further comprising initiating the sleep state when a home screen state of the electronic device is detected in addition to not receiving the second input via the input device prior to the expiration of the sleep timer.

12. The method of claim 8, further comprising detecting a change in an ambient light value when the electronic device is moved from an open position to a the closed position.

13. The method of claim 12, further comprising initiating the sleep state when the change in the ambient light value is greater than a predetermined ambient light value in addition to not receiving at least one of the first input or the second input via the input device prior to the expiration of the sleep timer.

14. A non-transitory computer-readable medium comprising instructions that, when executed, cause a machine to at least:
: receive a first input representative of a housing of an electronic device moving from an open position to a closed position;
: initiate a sleep timer;
: detect a first condition of the electronic device after detection of the housing moving from the open position to the closed position and prior to an expiration of the sleep timer;
: detect a second condition of the electronic device prior to the expiration of the sleep timer if the first condition is detected; and
: initiate a sleep state to lock the input device upon detection of the first condition and the second condition and prior to the expiration of the sleep timer.

15. The non-transitory computer-readable medium as defined in claim 14 comprising instructions that, when executed, cause a machine to at least detect the first condition by detecting a state of the electronic device when the electronic device is moved to the closed position and prior to the expiration of the sleep timer, detecting a change in ambient light value being greater than a predetermined ambient light value, detecting an inactivity level, or detecting a contact surface area of a display of the electronic device being substantially entirely contacted.

16. The non-transitory computer-readable medium as defined in claim 15 comprising instructions that, when executed, cause a machine to at least detect the second condition by detecting another one of the state of the electronic device, the change in the ambient light value being greater than a predetermined ambient light value, the inactivity level, or the contact surface area of the display of the electronic device being substantially entirely contacted.

17. The non-transitory computer-readable medium as defined in claim 16 comprising instructions that, when executed, cause a machine to at least initiate a sleep state when the change in an ambient light value is greater than a predetermined ambient light value in addition to not receiving a second input via an input device prior to the expiration of the sleep timer.

18. The non-transitory computer-readable medium as defined in claim 14 comprising instructions that, when executed, cause a machine to at least detect the first condition by monitoring an input device of the electronic device for activity when the electronic device is in the closed position and to detect the second condition by monitoring the state of the electronic device upon detecting the electronic device moving from the open position to the closed position.

19. The non-transitory computer-readable medium as defined in claim 18 comprising instructions that, when executed, cause a machine to at least initiate a sleep state upon detection of the state of the electronic device being in a home screen state in addition to not receiving an input via the input device prior to the expiration of the sleep timer.

* * * * *